United States Patent [19]

Shan Hai

[11] Patent Number: 4,647,059

[45] Date of Patent: Mar. 3, 1987

[54] BICYCLE WHICH CAN BE CONVERTED INTO A UNICYCLE

[76] Inventor: Wang Shan Hai, 4f-2, No. 145, 1 Sec, Chi-Lung Rd., Taipei City, Taiwan

[21] Appl. No.: 723,283

[22] Filed: Apr. 15, 1985

[51] Int. Cl.$^4$ .............................................. B62K 13/00
[52] U.S. Cl. .................................. 280/278; 280/7.15; 280/205; 280/287
[58] Field of Search ................ 280/278, 287, 205, 7.1, 280/7.15, 266; 272/73; 74/492, 548

[56] References Cited

FOREIGN PATENT DOCUMENTS

| 806200 | 6/1951 | Fed. Rep. of Germany | 280/287 |
| 2610644 | 9/1977 | Fed. Rep. of Germany | 280/287 |
| 388908 | 8/1908 | France | 280/287 |
| 591874 | 7/1925 | France | 280/287 |

Primary Examiner—John J. Love
Assistant Examiner—Everett G. Diederiks, Jr.
Attorney, Agent, or Firm—Holman & Stern

[57] ABSTRACT

A bicycle is convertible into a unicycle by use of quick-release couplings. The front wheel and handlebar are separable from the frame and rear wheel of the bicycle by release of a quick-release coupling. The handlebar can be removed by another quick-release coupling and replaced with the saddle of the bicycle. The saddle itself is held in place by its own quick-release coupling. The crank and pedal of the bicycle can be moved and attached to the axle of the front wheel to permit pedaling of the bicycle.

1 Claim, 12 Drawing Figures

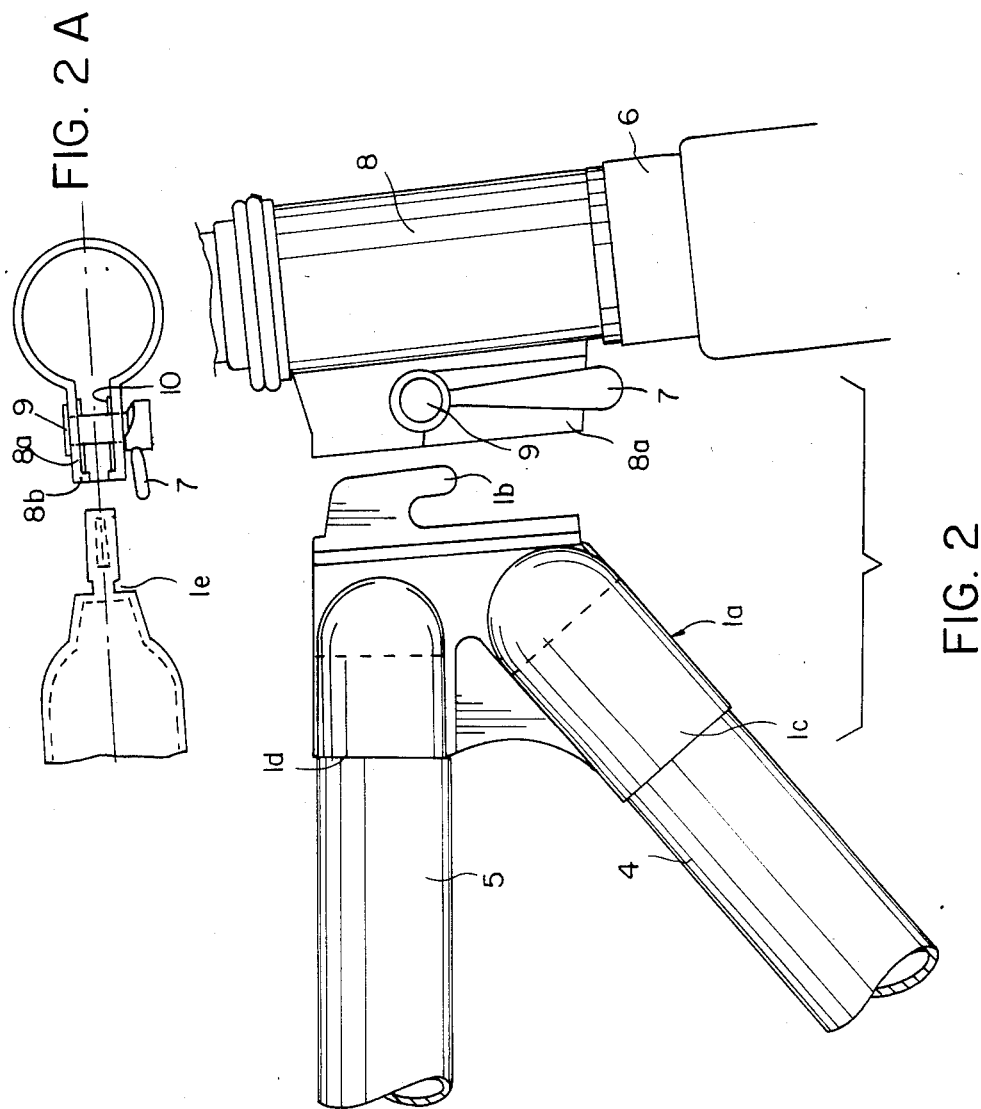

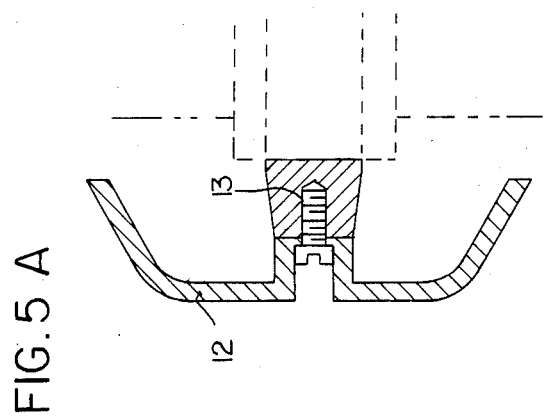
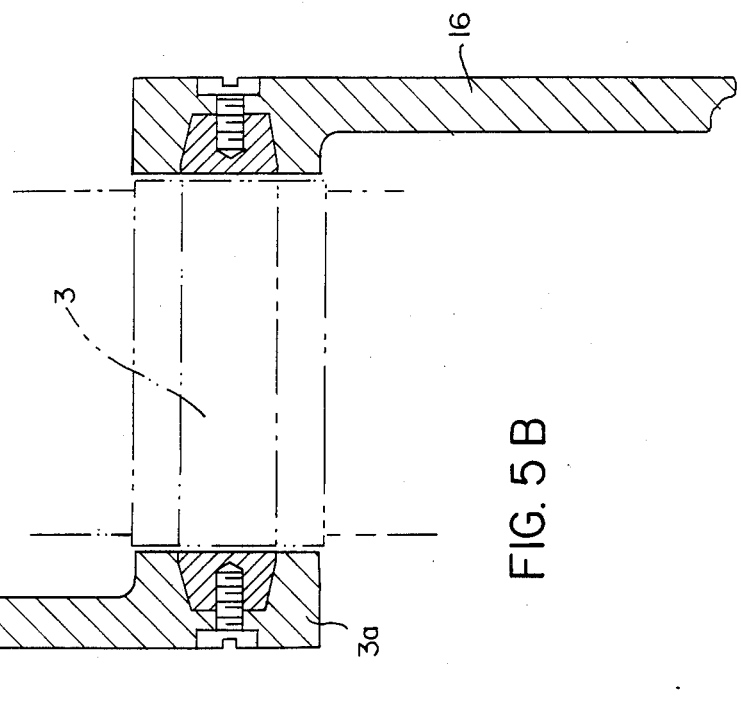
FIG. 5 A
FIG. 5 B

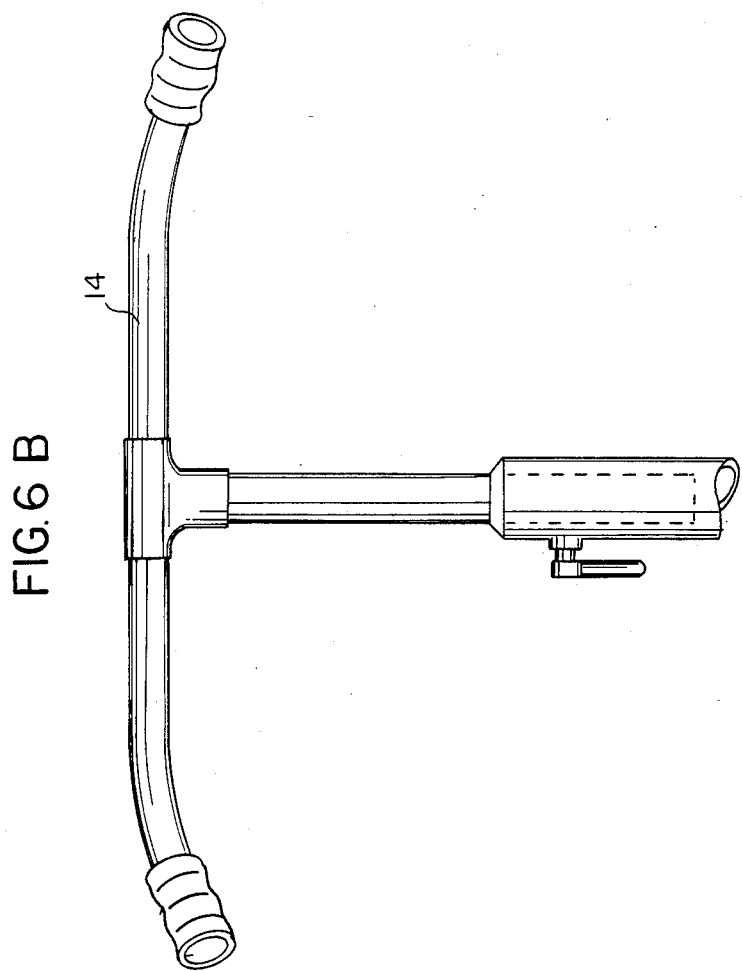
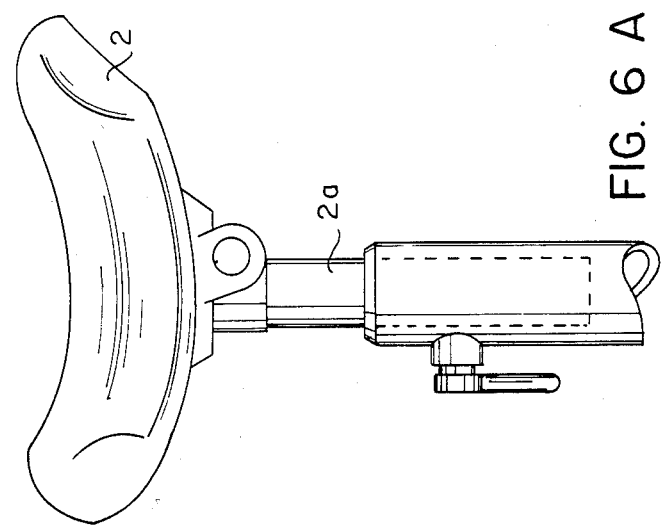
FIG. 6 B
FIG. 6 A

BICYCLE WHICH CAN BE CONVERTED INTO A UNICYCLE

BACKGROUND OF THE INVENTION

Bicycles are well-known in the transportation arts, and have at least two wheels, a front wheel and a back wheel. The present invention relates to bicycles which are convertible into unicycles.

Unicycles, including foot pedals, handlebar, and a single wheel which is usually directly connected to the foot pedals, are also well-known in the transportation arts. A bicycle in the prior art generally has no utility as a unicycle, and a unicycle generally has no utility as a bicycle. It is therefore a problem in the prior art to provide increased utility for a bicycle or a unicycle.

SUMMARY OF THE INVENTION

By the present invention, a bicycle which is convertible into a unicycle is shown. The front portion of a bicycle is separatable from a frame portion of the bicycle and the rear wheel. The handlebars which ordinarily are attached to the front wheel portion are replaced with a seat in the unicycle mode, and foot pedals are attached to the axle of the front wheel to permit pedaling

BRIEF DESCRIPTION OF THE DRAWINGS

FIG. 2 and 2A each show an enlarged, partially broken-away view of a coupling of the frame to the front portion of the bicycle;

FIG. 5A illustrates the front wheel axle with a reflecting disc covering one end;

FIG. 5B illustrates the pedals attached to the front axle in place of the reflecting disc;

FIG. 6A illustrates a saddle which can be used for the seat of the unicycle;

FIG. 6B illustrates handlebars usable with the front portion of the bicycle;

DETAILED DESCRIPTION OF THE INVENTION

Figure 1:
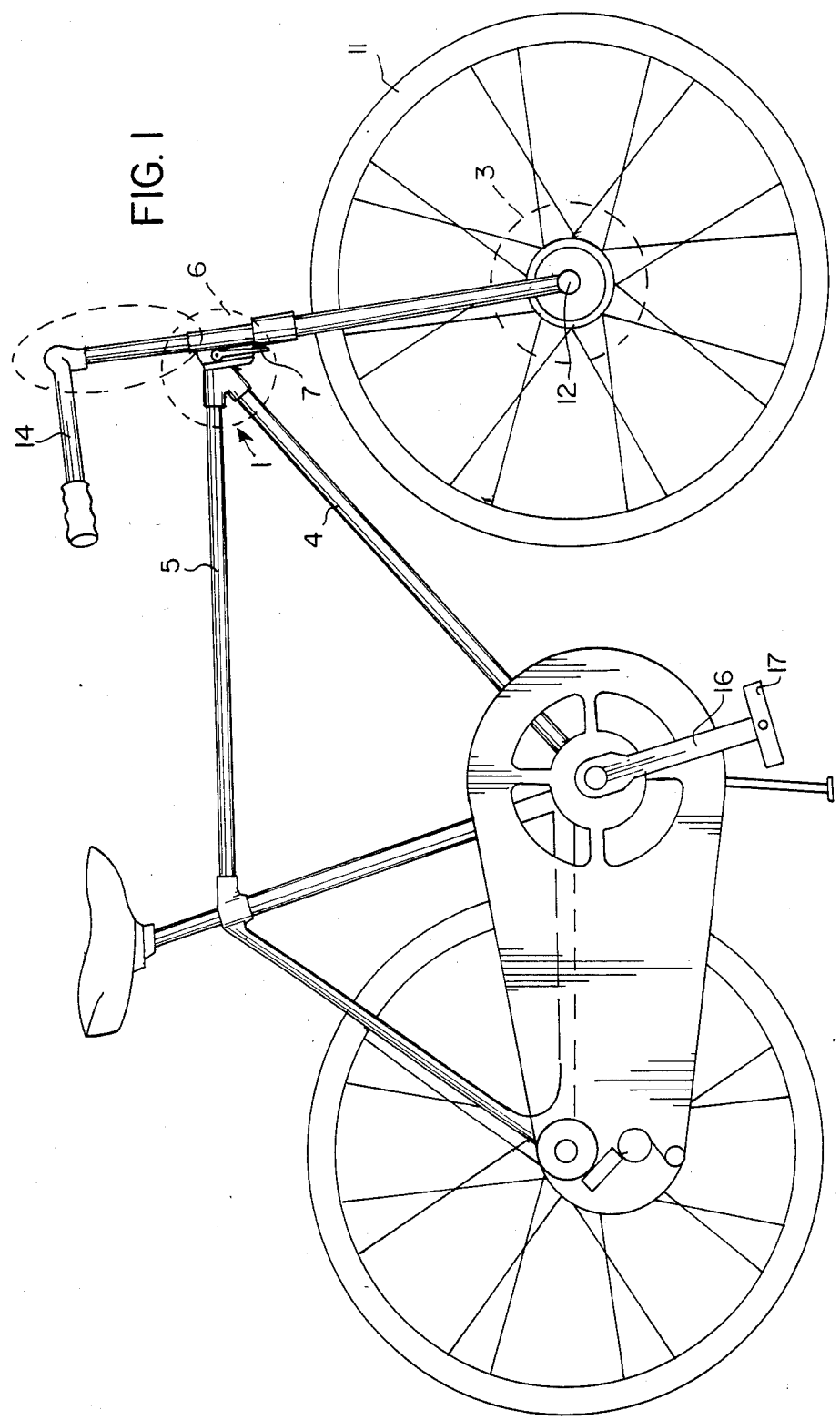
FIG. 1 is a front elevational view of a convertible bicycle according to the present invention.

FIG. 1 shows a sport-cycle with a quick lock-release 1 as the separatable device disposed between the fork stem 6 and the frame tubes 4, 5 of the cycle for connecting the two main portions together. In particular, the front stem 6 having the front wheel 11 is connected with the main frame 4, 5 which supports the rear wheel of the cycle. The sport-cycle in accordance with the present invention can be separated into the two portions. One of the portions including the fork stem 6 and front wheel 11 forms the uni-cyle. The fork stem 6, when separated, is converted into a uni-cycle by replacement of the handlebar 14 with a saddle and by placing a crank with a foot pedal on the hub of the front wheel for driving it.

As seen in FIG. 2, the quick lock-release connector includes a spigot piece 1a with two cylindrically-shaped shell portions 1c and 1b fitted with the lower tube 4 and the upper tube 5 by inserting the tube 4 into the cylindrically-shaped shell portion 1c, and by inserting the tube 5 into the cylindrically-shaped shell 1b. These parts are fixed tightly together, with no relative motion therebetween after assembly. A hook 1b extends from the body of the spigot piece 1a for hooking on a spindle 9 bridging a socket 8a by insertion of the hook 1b between the walls of the socket 8a. During assembly, the portion 8b of the socket 8a receives the slots 1e formed in the hook 1b.

Sleeve 8 is tightly retained and fixed upon the fork stem 6. The socket 8a extending from the sleeve 8 has two parallel walls, with a flange formed along either end edge of the walls as indicated as the rail 8b. A rubber sheet 10 is disposed on each inside parallel wall of the socket 8a, to permit a snug fit and to reduce vibration.

Figure 3A:
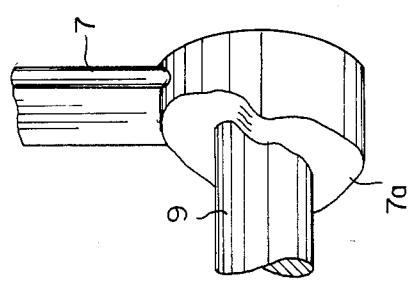
FIG. 3A illustrates the cam surface of the quick-release lever.
Figure 3:
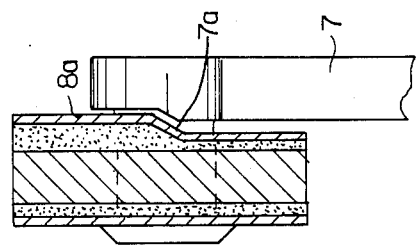
FIG. 3 shows the quick-release coupling with the hook therein.

The operating arm 7 has a cam head 7a as seen in FIG. 3A, and functions to control the quick lock-release at 1. As seen in FIG. 3, the cam head 7a conforms in one position of the lever 7 to a wall 8a which extends from the sleeve 8. The spindle 9 traverses or spans the walls of the socket 8a and passes through the axis of the cam 7a, the cam 7a having the arm 7 thereon. The axle 9 is fixedly connected to the cam 7a so as to be non-rotatable relative thereto. The surface of the cam 7a is adapted to contact the wall of the socket 8a such that a convex portion of the cam 7a can mate with a convex portion of the socket 8a. When the cam 7a of the arm 7 is place such that the convex portions of the cam 7a and the socket 8a are in contact, as seen in FIG. 4A, then a distance "1" between the two walls of the socket 8 is at its minimum and is just sufficient to squeeze tightly the hook 1b and the front portion of the spigot piece 1a.

Figure 4B:
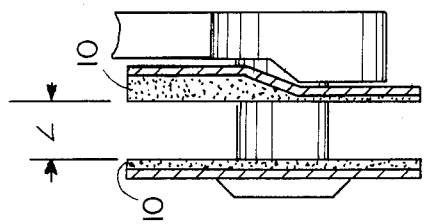
FIG. 4B illustrates the quick-release hook in the open position.
Figure 4:
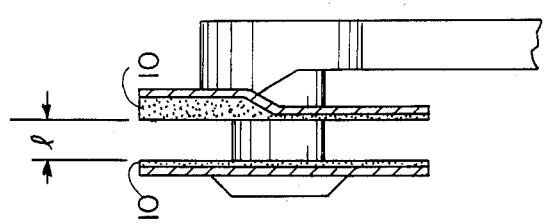
FIG. 4A illustrates the quick-release coupling in the tightened position.

As seen in FIG. 4B, when the cam 7a is actuated by movement of the arm 7 to be in position such that the convex portion of the cam 7a faces the concave portion of the wall of socket 8a, the distance "L" between the walls of socket 8 is enlarged. The enlargement is due to the resilient urging of the elastically resilient rubber sheet 10 which, due to the enlargement of the space between the walls of the socket 8, permits removal of the hook 1b and the spigot piece 1a by manually pulling the spigot piece 1a out of the socket 8 to separate the cycle into the two portions. The fork stem 6 and the front wheel 11 form a uni-cycle, while the rear wheel and frame can be made to continue standing by use of stands.

FIG. 5A illustrates in dotted outline the front wheel axle with an attaching screw 13 retaining a reflector 12 on the axle. As the axle has two ends, it is contemplated that the reflector 12 could be placed on both ends of the axle (unnumbered) in a manner similar to that shown in FIG. 5A. In converting the uni-cycle portion from the bicycle configuration, the reflector 12 is replaced with a crank 16 at either end of the axle 3. This is illustrated in FIG. 5B with the axle 3 being depicted in dotted outline. A pair of such cranks 16, 16 are shown in FIG. 5B, and form a conventional pedal arrangement. Each crank 16 preferably has a pedal 17 attached at an extremity thereof, such as is depicted in FIG. 1.

FIG. 6A illustrates the assembly of a saddle 2 having a saddle pillar 2a disposed within an opening in the support for the saddle. A quick-release lever, unnumbered in FIG. 6A, can be manipulated to release or tighten the saddle pillar 2a. This permits ready removal for insertion of the saddle 2.

FIG. 6B illustrates a handlebar 14 which is inserted by a quick-release coupling in a manner similar to that shown for the saddle 2 as seen in FIG. 6A. The handlebar 14, during conversion from a bicycle to a uni-cycle, would be removed by release of the quick-release lever (unnumbered in FIG. 6B), removal of the handlebar 14, removal of the saddle 2 from its usual position in the bicycle arrangement, and insertion of the saddle 2 into the quick-release coupling formerly occupied by the handlebar 14.

Figure 7:
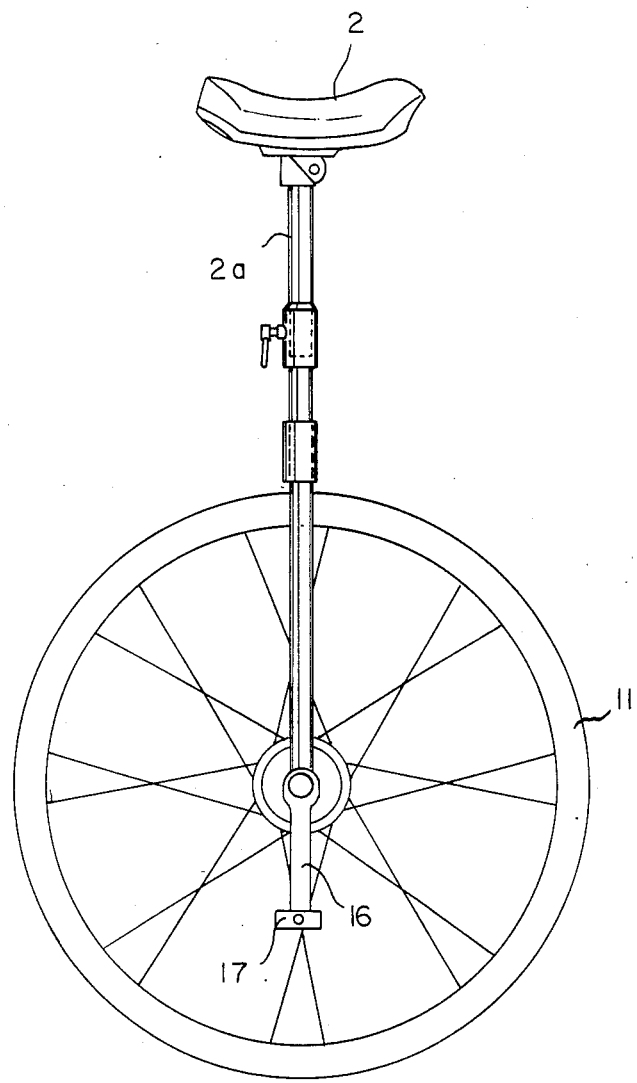
FIG. 7 shows the unicycle after separated.

The completed, converted unicycle is seen in side elevational view in FIG. 7. The unicycle is formed with the front tire 11, crank 16, pedal 17, saddle pillar 2a, and saddle 2.

While there has been shown and described a preferred embodiment of a newer sport-cycle with release devices which may be separated into a uni-cycle, it is understood that the invention may be otherwise embodied within the scope of the following claim.

What is claimed is:
1. A convertible sport-cycle, comprising:
- a bicycle having a front portion and a rear portion connected together by a quick lock-release means; said quick lock-release means being manually actuatable to selectively connect said front portion and said rear portion of said bicycle;
- said quick lock-release means including a spigot piece; said spigot piece having two cylindrically-shaped portions receiving frame tubes of the bicycle; said spigot piece having a hook extending therefrom;
- a sleeve fixed on a fork stem of said bicycle; said sleeve having a socket; said socket having two parallel walls, each of said two parallel walls having a flange disposed adjacent an end edge of said each wall;
- a spindle rotatably supported by said two parallel walls; said spindle being fixedly connected to a cam head; said cam head being fixedly connected to an operating arm;
- whereby said operating arm is manually actuatable to control said quick lock-release means to selectively lock together or release said hook from said socket;
- said cam head having a convex surface and a concave surface mating with a wall of said socket;
- said bicycle having a fork stem supporting a handlebar; said handlebar being removable; a saddle detachably connected to a pillar of said bicycle; said handlebar being connected to said fork stem by a connecting means; said connecting means being connectable to said saddle;
- whereby, when said front portion is separated from said rear portion, said handlebar may be replaced by said saddle;
- said bicycle having a front wheel; said front wheel having a hub; at least one foot pedal being attachable to said front wheel for driving the separated said front portion after it has been separated from said rear portion;
- whereby said front portion is convertible into a unicycle.

* * * * *